Oct. 6, 1964  I. Y. JOHNSON  3,151,885
IMPLEMENT HITCH
Filed Feb. 6, 1961  3 Sheets-Sheet 1
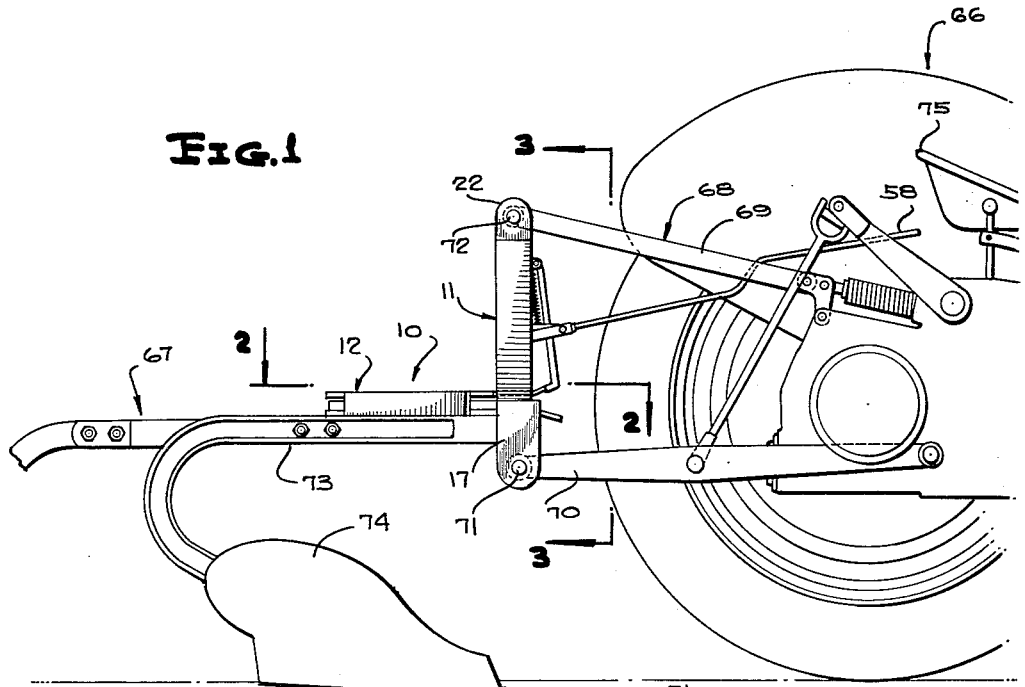
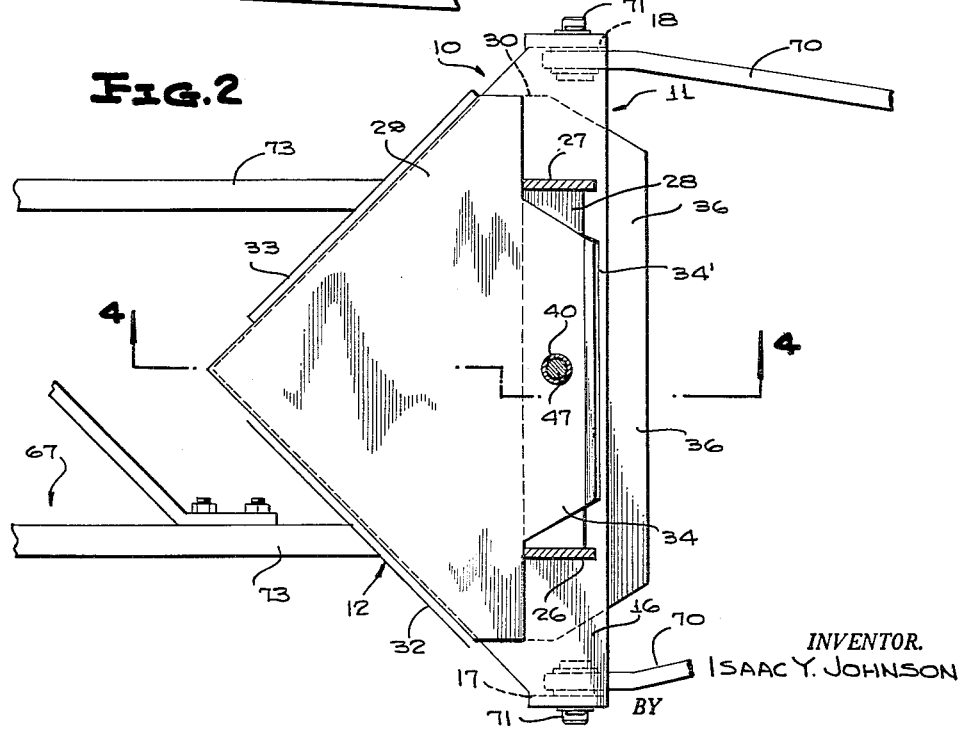
INVENTOR.
ISAAC Y. JOHNSON
BY
Mason, Porter, Diller & Stewart
ATTORNEYS Oct. 6, 1964　　　I. Y. JOHNSON　　　3,151,885
IMPLEMENT HITCH
Filed Feb. 6, 1961　　　　　　　　　　　　3 Sheets-Sheet 2
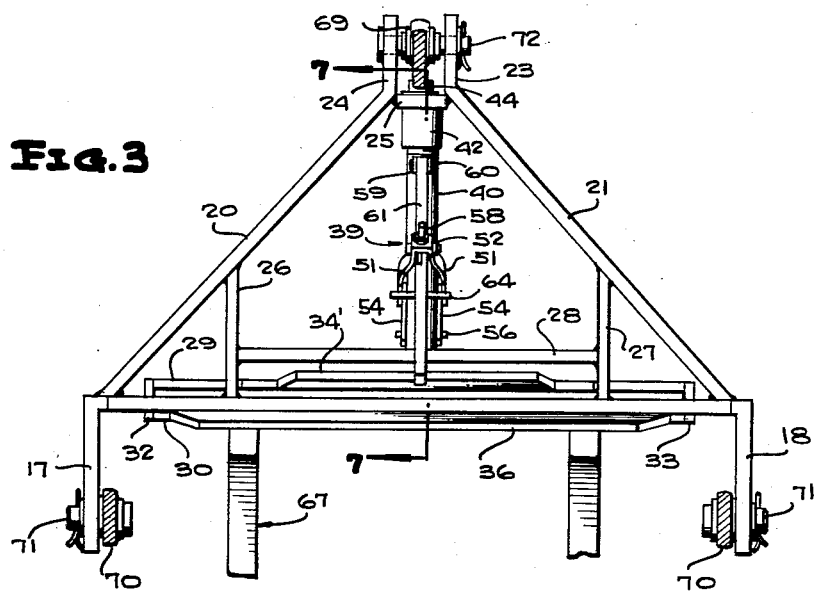
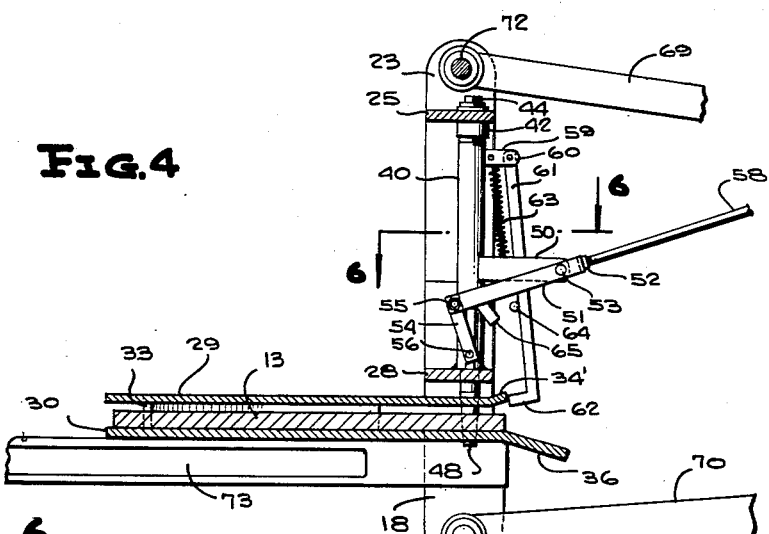
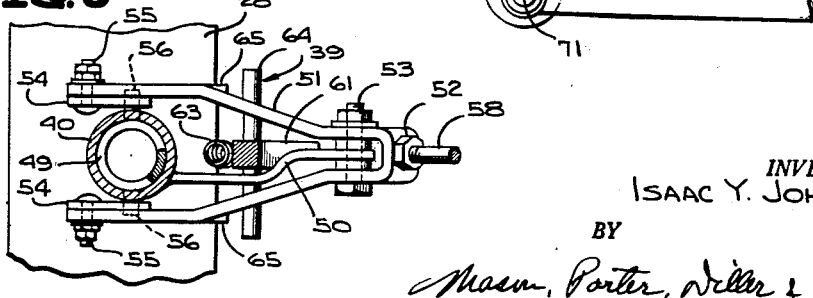
INVENTOR.
ISAAC Y. JOHNSON
BY
Mason, Porter, Diller & Stewart
ATTORNEYS Oct. 6, 1964  I. Y. JOHNSON  3,151,885
IMPLEMENT HITCH
Filed Feb. 6, 1961  3 Sheets-Sheet 3
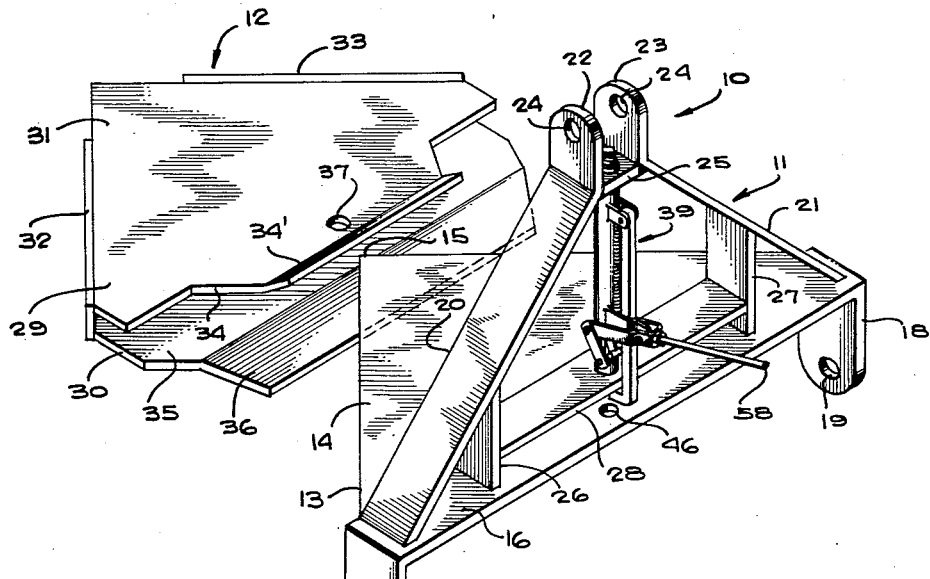
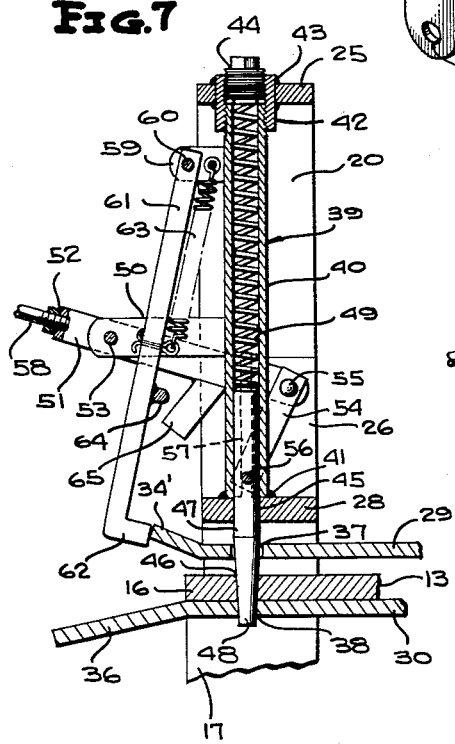
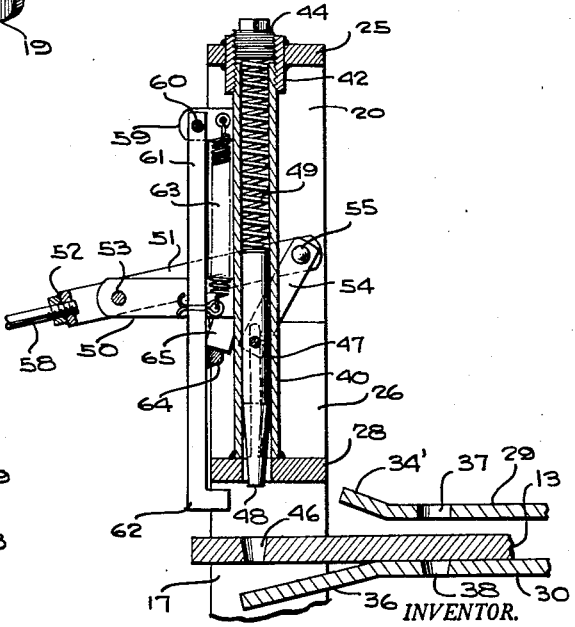
INVENTOR.
ISAAC Y. JOHNSON
BY
ATTORNEYS United States Patent Office 3,151,885
Patented Oct. 6, 1964

3,151,885
IMPLEMENT HITCH
Isaac Y. Johnson, 108 W. Canal, Aberdeen, Miss., assignor of one-fourth to Sam J. Creekmore, one-fourth to W. J. Little, and one-fourth to James Little, all of Amory, Miss.
Filed Feb. 6, 1961, Ser. No. 87,231
3 Claims. (Cl. 280—477)

This invention relates in general to new and useful improvements in hitch construction, and more specifically relates to a novel implement hitch particularly adapted for use in conjunction with the customary three-point suspension type of tractor hitch.

Certain types of tractors are provided with what is commonly referred to as a three-point suspension type hitch. With this type of hitch, not only is the implement pulled behind the tractor, but it is also connected to the tractor in a manner in which it may be raised and lowered by the operator of the tractor. Such a hitch is highly desirable, but has the disadvantage in that the implement cannot be quickly attached thereto and removed therefrom. It is therefore the primary object of this invention to provide a novel implement hitch to be used in conjunction with a conventional tractor hitch of the three-point suspension type wherein the implement may be readily attached to and removed from the tractor, and at the same time, may be rigidly connected to the hitch of a tractor for both towing and raising and lowering by the tractor.

Another object of this invention is to provide a novel implement hitch intended for the purpose of rigidly connecting an implement to a three-point suspension type tractor hitch, the implement hitch including one part intended to be carried by the tractor hitch and another part intended to be carried by an implement, the two parts being so related wherein it is merely necessary to back the tractor up into alignment with the implement, at which time the two parts are automatically engaged and the implement is rigidly connected to the implement hitch of the tractor for raising and lowering by the tractor hitch.

Still another object of the invention is to provide a novel implement hitch intended to be used in connecting an implement to a three-point type suspension hitch customarily found on tractors, the implement hitch being of an extremely simple construction and relatively light in weight and being formed in two parts, one of which is connected to the three-point suspension hitch of a tractor in the customary manner of attaching an implement thereto, and the other part thereof being easily connected to an implement in any desired manner.

Another object of the invention is to provide a novel implement hitch which may be used for the purpose of connecting an implement to a three-point suspension type of tractor hitch in a manner to enjoy all of the advantages of this particular type of tractor hitch, the implement hitch including a first member attached to the tractor hitch and a second member attached to the implement, the members having internested plates which are tightly interlocked with one another and which prevent any relative movement of the two hitch members, thereby eliminating relative movement of the implement with respect to the tractor hitch, the plates further being shaped in a manner which permits the plates to be interlocked by merely backing the tractor into alignment with the implement.

A still further object of this invention is to provide a novel latch for use with an implement hitch, the latch including a spring loaded pin and a releases arm normally holding the pin in a retracted position, the releases arm being engaged by portions of the implement hitch as the implement hitch halves are connected together to automatically release the pin for movement to an implement hitch latching position, the pin also having connected thereto suitable linkage which permits the pin to be retracted by the operator of an associated tractor while remaining seated thereon so that the operator of the tractor may readily engage and disengage an implement while remaining seated on the tractor and at the same time, the advantages of the three-point type suspension of customary tractors may be employed utilizing the latch and an associated hitch structure.

With the above, and other objects in view that will hereinafter appear, the nature of the invention will be more clearly understood by reference to the following detailed description, the appended claims and the several views illustrated in the accompanying drawings.

In the drawings:

FIGURE 1 is a fragmentary side elevational view of a rear portion of a tractor and a portion of an implement, the implement being connected to the three-point suspension type hitch of the tractor by the implement hitch which is the subject of this invention, the right rear wheel of the tractor being omitted for purposes of clarity.

FIGURE 2 is a fragmentary horizontal sectional view on an enlarged scale, taken along the line 2—2 of FIGURE 1, and shows further the details of the implement hitch.

FIGURE 3 is a fragmentary enlarged vertical sectional view, taken along the line 3—3 of FIGURE 1, and shows further the details of the implement hitch.

FIGURE 4 is an enlarged fragmentary longitudinal sectional view, taken along the line 4—4 of FIGURE 2, and shows the relationship of the two halves of the implement hitch.

FIGURE 5 is an exploded perspective view of the components of the implement hitch in their separated positions.

FIGURE 6 is an enlarged fragmentary horizontal sectional view, taken along the line 6—6 of FIGURE 4, and shows the specific details of the latch means of the implement hitch.

FIGURE 7 is an enlarged fragmentary vertical sectional view taken through the latch means of the implement hitch and shows the specific details thereof when the latch means are in the hitch latching position thereof.

FIGURE 8 is an enlarged fragmentary vertical sectional view similar to FIGURE 7 and shows the latch means in the hitch releasing position thereof.

Reference is now made to the drawings in detail, and more particularly to FIGURE 5 of the drawings, wherein the implement hitch, which is the subject of this invention, is specifically illustrated. The implement hitch is generally referred to by the numeral 10. The implement hitch 10 includes a first hitch member, generally referred to by the numeral 11, and a second hitch member, generally referred to by the numeral 12.

The hitch member 11 is intended to be carried by a tractor in a manner to be described in detail hereinafter, and includes a plate 13 which is horizontally disposed. The plate 13 includes a generally triangular rear portion 14 which terminates at the rear end thereof in a centrally located point 15, and a forward transversely extending strap-like portion 16. The strap-like portion 16 terminates at its ends in downwardly extending ears 17, 18 which are in widely transversely spaced parallel relation. The ears 17, 18 have aligned openings 19 therethrough.

A pair of frame members 20, 21 extend upwardly and inwardly from the outer ends of the strap-like portion 16 in overlying relation thereto. The frame members 20, 21 terminate at their upper ends in upstanding ears 22, 23, respectively. The ears 22, 23 are in closely spaced parallel relation and have aligned openings 24 therethrough.

The frame members 20, 21 are connected together at their upper ends by a horizontally disposed brace 25. Intermediate portions of the frame members 20, 21 are braced by upstanding braces 26, 27 which have their lower ends secured to the strap-like portion 16. The braces 26, 27 are further connected together by a horizontal frame member 28 which is disposed in spaced parallel relation to the strap-like portion 16.

The second hitch member 12 is formed of a pair of vertically spaced, parallel plate 29, 30. Each of these plates is provided with a pointed rear portion 31, and the two plates 29, 30 are connected together by elongated straps 32, 33. The plate 29, which is disposed uppermost, has a forward tongues portion 34 which is narrower than the width of the plate 29 and which terminates in a forward upwardly sloping lip 34'. The plate 30 also includes a forwardly extending tongue portion 35 which is relatively long and which terminates in a narrower downwardly sloping lip portion 36. The tongue portions 34 and 35 are provided with aligned openings 37 and 38, respectively.

A latch mechanism, generally referred to by the numeral 39, is carried by the brace 25 and the frame member 28. As is best shown in FIGURES 7 and 8, the latch mechanism 39 includes a vertically extending tube 40 which has its lower end secured to the frame member 28 by welding 41. The upper end of the tube 40 is threaded into a coupling 42 which is welded to the brace 25, as at 43. The upper end of the tube 40 is closed by a plug 44 which is removably threaded into the coupling 42.

The frame member 28 is provided with an opening 45 which is aligned with the tube 40. The strap-like portion 16 of the plate 13 is provided with an opening 46 aligned with the opening 45.

A latch pin 47 is telescoped within the lower portion of the tube 40 and has a tapered lower portion 48 adapted to be projected from within the tube 40 through the opening 45 and into the opening 46 with a portion of the pin depending below the strap-like portion 16. A coil spring 49 carried in the upper portion of the tube 40 counteracts against the plug 44 and the upper end of the latch pin 47 to urge the latch pin 47 to a projected position.

An offset arm 50 is secured to an intermediate portion of the tube 40 and projects longitudinally therefrom. A pair of links 51 have their forward ends connected together by a fitting 52 and are connected to the arm 50 for pivotal movement by a transverse pivot pin 53 which passes through the forward portions of the links 51. The opposite ends of the links 51 are individually pivotally connected to other links 54 by aligned pivot pins 55. The ends of the links 54 remote from the links 51 are pivotally connected to the pin 47 by a pivot pin 56 which passes outwardly through diagonally opposite slots 57 formed in the tube 40 and the frame member 28. An elongated handle 58 is secured to the fitting 52 and projects forwardly therefrom for use in retracting the latch pin 47.

A bracket 59 is secured to the upper portion of the tube 40 and carries a pivot pin 60 which, in turn, receives the upper end of a release arm 61. The release arm 61 extends down alongside the arm 50 and between the links 51 and terminates at its lower end in a rearwardly directed foot 62. A coil spring 63 carried at its upper end by the bracket 59 and connected to an intermediate portion of the release arm 61 serves to urge the release arm 61 to a position generally parallel to the tube 40.

The release arm 61 carries a transverse pin 64. When the latch pin 47 is in its retracted position, as is best shown in FIGURE 8, the pin 64 underlies the lower ends of stops 65 carried by the links 51 and prevents downward pivoting of the links 51 so as to prevent downward movement of the latch pin 47. However, when the release arm 61 is pivoted in a clockwise direction, as viewed in FIGURE 8, the transverse pin 64 moves out from beneath the stop members 65 and the latch pin 47 is free to be moved downwardly by the coil spring 49.

As is best shown in FIGURE 7, when the first and second hitch members 11 and 12 are brought into engagement, the plate 13 passes in between the plates 29 and 30, the pointed end 15 of the plate 13 freely passing between the lips 34' and 36 and permitting relative ease of alignment of the first and second hitch members 11 and 12. As the plates 13, 29 and 30 are further telescoped relative to each other, the plate 13 will engage the straps 32, 33 and result in transverse alignment of the plates 13, 29 and 30. As the plates 13, 29 and 30 are further telescoped together, the engagement of the plate 13 with the straps 32, 33, will result in a final interlock between the three plates, and at this time, the openings 45, 37, 46 and 38 will be aligned. It is to be noted that when the plates 13, 29 and 30 are interlocked, the lip 34' of the plate 29 will engage the foot 62 of the release arm 61 and swing the release arm 61 to a position where the transverse pin 64 no longer engages the stops 65 and the latch pin 47 is released to ride down over the upper surface of the lip 34 and the tongue 33 until such time as the openings 37 and 38 are aligned with the latch pin 47, at which time it passes through the openings 37, 46 and 38 to the position illustrated in FIGURE 7.

It will be understood that when the latch pin 47 enters into the openings 37, 46 and 38, the edges of the plate 13 are in tight engagement with the straps 32, 33. As a result, there can be no relative movement between the plate 13 and the plates 29 and 30, except for a slight vertical movement which is necessary to permit the plates to be interlocked with one another. Therefore, when the hitch members 11 and 12 are connected together, they form a rigid unit, even though the parts may be readily internested or interlocked. The implement hitch 10 is now related to a tractor, which is generally referred to by the numeral 66, and an implement, which is generally referred to by the numeral 67. The tractor 66 is provided with a hitch structure, generally referred to by the numeral 68, which is of the conventional three-point suspension type. The hitch 68 includes an upper centrally located arm 69 and a pair of lower outer arms 70, in the conventional manner. The arms 70 are connected to the ears 17 and 18 by means of suitable pins 71. An elongated pin 72 connects the arm 69 to the ears 22, 23. In this manner, the first hitch member 11 is secured to the tractor hitch 68 in the conventional manner for movement with the tractor and to be raised and lowered in accordance with the desires of the operator of the tractor.

The implement 67 is provided with a suitable draw bar 73 which is suitably secured to the second hitch member 12 in any desired manner, including welding. It is to be understood that it is immaterial as to the nature of the implement, although it is desirable that the implement be of the type normally supported by the tractor in the use thereof. As illustrated, the implement 67 is in the form of a gang plow, having a plurality of plow blades 74.

*Operation*

It is to be understood that the implement 67 may be left standing when not connected to the tractor 66, with the position of the implement 67 being such that the implement hitch member 12 generally horizontally disposed. It is also to be understood that when the implement hitch 10 is being utilized, the implement hitch member 11 will remain connected to the hitch assembly 68 of the tractor 66. When it is desired to connect the implement 67 to the tractor 66, the tractor 66 is backed into alignment with the implement 67 and the tractor hitch 68 is raised or lowered in the necessary manner to align the plate 13 for movement between the plates 29, 30. The tractor 66 is then further backed, with the plate 13 passing in between the plates 29, 30, due to the lips 34' and 36 on the plates 29 and 30, respectively, and the shape of the plate 13. As the tractor 66 continues to move rearwardly after the plate 13 has engaged between the plates 29, 30, an edge of the triangular portion 14 of the plate 13 will engage one of the straps 32, 33 and effect alignment of the hitch member 11 with the hitch member 12. When the plate 13 is finally fully seated between the plates 29, 30, the openings 45, 37, 46 and 38 will all be aligned and the latch pin 47 will be moved downwardly through these aligned openings to fixedly secure the plate 13 to the plates 29, 30. It is now merely necessary for the operator of the tractor 66 to operate the tractor in the normal manner wherein the implement 67, or any other desired implement, is connected to the tractor in the usual manner, utilizing the three-point suspension type hitch 68.

It will be readily apparent that since the edges of the triangle portions 14 of the plate 13 are engaged with the straps 32, 33, and the hitch pin 47 passes through the openings 37, 46 and 38, there can be no longitudinal movement of the plate 13 relative to the plates 29, 30. Therefore, the tractor 66 may place a steady pull on the implement 67.

It is also to be seen that there can be no transverse swinging movement of the implement 67 relative to the tractor 66 since the three-point suspension type hitch 68 is a rigid type of support, and there can be no pivoting of the plates 29, 30 relative to the plate 13 about the latch pin 47 due to the engagement of the edges of the triangular portion 14 of the plate 13 with the straps 32, 33. In addition, while there is a slight vertical clearance between the plate 29, 30 and the plate 13, this vertical clearance is insufficient to result in any rocking movement of the implement 67 due to the comparative sizes of the plates 13, 29 and 30 with respect to the vertical clearance. It is also pointed out at this time that the movement of the hitch pin 47 into the openings 37, 46 and 38 is positively assured in that the shape of the forward portion of the plate 29 is such that the forward edge of the plate 29 engages the vertical braces 26, 27, as is shown in FIGURE 2, to limit the rearward movement of the hitch member 11 with respect to the hitch member 12 and assure the stopping of the movement of the hitch members 11 and 12 relative to each other with the latch pin 47 aligned with the openings 37, 46 and 38.

When it is desired to release the implement 67 from the tractor 66, it is merely necessary for the operator of the tractor 66 to move the implement 67 to the desired position utilizing the tractor. The implement 67 is then set on the ground and, if necessary, a suitable prop placed therebeneath. The operator of the tractor 66, while seated on the seat 75 of the tractor, merely reaches behind him and pushes down on the forward end of the handle 58 with the result that the hitch pin 47 is withdrawn out of the openings 37, 46 and 38. While the hitch pin 47 is held in an elevated position, the tractor 66 is moved forwardly, and as the lip 34' moves out of engagement with the foot 62 of the release arm 61, the spring 63 will move the release arm 61 forwardly, as viewed in FIGURE 7, so that the transverse rod 64 will move under the stop members 65 and serve to automatically retain the latch pin 47 in its elevated or retracted position. The tractor 66 may now be driven away from the implement 67 and used for other purposes, or connected to other implements with like hitch members 12 secured thereto.

From the foregoing, it will be seen that novel and advantageous provision has been made for carrying out the desired ends. However, attention is again drawn to the fact that variations may be made in the example implement hitch disclosed herein without departing from the spirit and scope of the invention, as defined in the appended claims.

I claim:

1. An implement hitch for releasably connecting an implement to a tractor hitch of the three-point suspension type, said implement hitch comprising a first hitch member adapted to be secured to a three-point suspension tractor hitch for raising and lowering thereby, and a second hitch member adapted to be rigidly secured to an implement, said first and second hitch members having interfitting parts adapted to form a rigid interfitting relation therebetween, and latch means releasably retaining said parts in interfitting relation independent of the applied force tending to separate said first and second members, said latch means including an upright support member, a pin telescoped in the lower portion of said support member for partial projection therefrom, a spring in the upper portion of said support member reacting on said pin and urging said pin to a projected position, an offset arm rigidly secured to said support member, a link pivotally connected to said offset arm, linkage pivotally connected to said link and said pin for effecting the retraction of said pin upon movement of the portion of said link connected to said linkage in an upward direction, said link provided with a stop member, said latch means including a release arm pivotably associated with said support member, means for urging said release arm to a normal first position, said release arm provided with a stop engaging means for contacting said stop while said release arm is in said first position, and said release arm movable to a second position by said second hitch member whereby said stop is released by said stop engaging means, said pin is urged to its projected position and said link is moved from an initial position to a second position whereby upon manual actuation thereof to its said first position by an operator of an associated tractor causes the retraction of said pin.

2. An implement hitch for releasably connecting an implement to a tractor hitch of the three-point suspension type, said implement hitch comprising a first hitch member adapted to be secured to a three-point suspension tractor hitch for raising and lowering thereby, and a second hitch member adapted to be rigidly secured to an implement, said first and second hitch members having interfitting means adapted to form a rigid interfitting relation therebetween, and latch means releasably retaining said parts in interfitting relation independent of the applied force tending to separate said first and second members, said latch means including a pin, first spring means normally biasing said pin to a first projected position, linkage means connected to said pin for urging said pin to a second retracted position, a release arm, means mounting said release arm independently of said linkage means, cooperable locking means carried by said release arm and said linkage means for holding said pin in the second position thereof, and second spring means maintaining said cooperable locking means locked in the second position of said pin.

3. The implement hitch of claim 2 wherein said second spring means is connected to said release arm independently of said linkage means.

References Cited in the file of this patent
UNITED STATES PATENTS

| | | |
|---|---|---|
| 2,069,928 | Runyan | Feb. 9, 1937 |
| 2,113,338 | Wohldoff | Apr. 5, 1938 |
| 2,341,807 | Olmstead et al. | Feb. 15, 1944 |
| 2,442,439 | Schultz | June 1, 1948 |
| 2,478,736 | Balzer | Aug. 9, 1949 |
| 2,685,453 | Kuhary et al. | Aug. 3, 1954 |
| 2,820,649 | Demarest | Jan. 21, 1958 |
| 2,904,116 | Wessendorf | Sept. 15, 1959 |